United States Patent
Hulvey

(10) Patent No.: US 10,659,941 B2
(45) Date of Patent: May 19, 2020

(54) COMMUNICATING PACKETS IN A MESH NETWORK

(71) Applicant: Cypress Semiconductor Corporation, San Jose, CA (US)

(72) Inventor: Robert Hulvey, Redondo Beach, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/022,286

(22) Filed: Jun. 28, 2018

(65) Prior Publication Data

US 2019/0289487 A1 Sep. 19, 2019

Related U.S. Application Data

(60) Provisional application No. 62/642,445, filed on Mar. 13, 2018, provisional application No. 62/642,307, filed on Mar. 13, 2018.

(51) Int. Cl.

| *H04W 4/80* | (2018.01) |
| *H04L 12/26* | (2006.01) |
| *H04L 29/06* | (2006.01) |
| *H04W 40/24* | (2009.01) |
| *H04B 17/318* | (2015.01) |
| *H04W 28/02* | (2009.01) |
| *G01S 11/08* | (2006.01) |
| *H04W 84/18* | (2009.01) |

(52) U.S. Cl.
CPC .......... *H04W 4/80* (2018.02); *H04B 17/318* (2015.01); *H04L 43/022* (2013.01); *H04L 43/106* (2013.01); *H04L 69/22* (2013.01); *H04W 28/021* (2013.01); *H04W 40/244* (2013.01); *G01S 11/08* (2013.01); *H04W 84/18* (2013.01)

(58) Field of Classification Search
CPC ..... H04W 28/021; H04W 4/80; H04W 84/18; H04B 17/318
See application file for complete search history.

(56) References Cited

U.S. PATENT DOCUMENTS

| 6,101,217 A | 8/2000 | Gut |
| 6,346,911 B1 | 2/2002 | King |

(Continued)

OTHER PUBLICATIONS

USPTO Non-Final Rejection for U.S. Appl. No. 16/022,489 dated Sep. 21, 2018; 25 pages.

(Continued)

*Primary Examiner* — Dady Chery

(57) ABSTRACT

An apparatus includes a Bluetooth transceiver configured to receive a packet transmitted to a Bluetooth mesh network via a radio-frequency signal. The apparatus also includes a processing device coupled to the Bluetooth transceiver. The processing device is configured to determine a strength of the radio-frequency signal. The processing device is also configured to determine a time period based on the measure of strength of the radio-frequency signal. The processing device is further configured to determine whether the Packet was received again during the time period. The processing device is further configured to transmit the Packet to the Bluetooth mesh network in response to determining that the Packet was not received again during the time period.

20 Claims, 8 Drawing Sheets

(56) References Cited

U.S. PATENT DOCUMENTS

| | | |
|---|---|---|
| 6,549,594 B1 | 4/2003 | Chen et al. |
| 7,224,714 B1 | 5/2007 | Barman et al. |
| 7,782,813 B2 | 8/2010 | Wheeler et al. |
| 8,005,055 B2 | 8/2011 | Kwak et al. |
| 8,149,715 B1 | 4/2012 | Goel et al. |
| 8,233,091 B1 | 7/2012 | Rabinowitz et al. |
| 8,325,704 B1 | 12/2012 | Lemkin et al. |
| 8,442,029 B2 | 5/2013 | Picard |
| 8,594,018 B2 | 11/2013 | Richards et al. |
| 8,717,898 B2 | 5/2014 | Xiao et al. |
| 8,837,316 B2 | 9/2014 | Zhang et al. |
| 8,885,519 B2 | 11/2014 | Aguirre et al. |
| 8,994,587 B2 | 3/2015 | Bolotski et al. |
| 9,116,234 B2 | 8/2015 | Dierendonck et al. |
| 9,143,967 B2 | 9/2015 | Chen et al. |
| 9,491,658 B2 | 11/2016 | Dwivedi et al. |
| 9,577,702 B2 | 2/2017 | Seller |
| 9,681,165 B1 | 6/2017 | Gupta et al. |
| 9,788,220 B2 | 10/2017 | Kalkunte et al. |
| 9,906,317 B2 | 2/2018 | Tipton et al. |
| 9,949,302 B2* | 4/2018 | Price .................... H04B 17/318 |
| 9,980,160 B2* | 5/2018 | Tilly ..................... H04W 36/20 |
| 10,069,592 B1 | 9/2018 | Krunz et al. |
| 10,158,443 B1 | 12/2018 | Berger et al. |
| 10,169,592 B2 | 1/2019 | Bray et al. |
| 2004/0072582 A1 | 4/2004 | Aljadeff et al. |
| 2005/0152317 A1 | 7/2005 | Awater et al. |
| 2005/0282494 A1* | 12/2005 | Kossi .................... H04W 88/06 455/41.2 |
| 2006/0033443 A1 | 2/2006 | Ishii et al. |
| 2006/0203925 A1 | 9/2006 | Pirooz et al. |
| 2006/0215739 A1 | 9/2006 | Williamson et al. |
| 2012/0320787 A1 | 12/2012 | Sugar et al. |
| 2014/0126461 A1* | 5/2014 | Ghosh .................. H04W 88/04 370/315 |
| 2015/0172941 A1 | 6/2015 | Agarwal et al. |
| 2016/0072545 A1 | 3/2016 | Gupta et al. |
| 2016/0259032 A1 | 9/2016 | Hehn et al. |
| 2016/0302195 A1* | 10/2016 | Zhang ............... H04W 72/0446 |
| 2016/0337223 A1 | 11/2016 | Mackay |
| 2017/0029559 A1 | 2/2017 | Lu et al. |
| 2017/0078897 A1 | 3/2017 | Duan et al. |
| 2017/0098466 A1 | 4/2017 | Elliot et al. |
| 2017/0134227 A1* | 5/2017 | Song ..................... H04L 1/1887 |
| 2017/0135676 A1 | 5/2017 | Rothberg et al. |
| 2017/0150379 A1* | 5/2017 | Tilly .................... H04W 36/20 |
| 2017/0188192 A1 | 6/2017 | Mujtaba et al. |
| 2017/0251488 A1* | 8/2017 | Urban ............... H04W 72/1263 |
| 2017/0280487 A1* | 9/2017 | Price .................... H04B 17/318 |
| 2017/0295599 A1* | 10/2017 | Mohaupt ............... H04W 8/005 |
| 2017/0317906 A1 | 11/2017 | Tsai et al. |
| 2017/0325056 A1 | 11/2017 | Mehta et al. |
| 2018/0014102 A1* | 1/2018 | Hirsch ................. H04R 1/1016 |
| 2018/0014217 A1 | 1/2018 | Kleinbeck et al. |
| 2018/0132102 A1* | 5/2018 | Kwon ............... H04W 28/0215 |

OTHER PUBLICATIONS

Calvo-Palomino, Roberto, et al., "Nanosecond-precision Time-of-Arrival Estimation for Aircraft Signals with low-cost SDR Receivers," Feb. 20, 2018, 6 pages.

Chao Yi Bian, "Relative Link Quality Assessment and Hybrid Routing Scheme for Wireless Mesh Networks," IEEE Communications Society, 2011, 6 pages.

Devipriay A., Smart Association Control in Wireless Fidelity Using FBA, International Journal of Computer Science and Mobile Commuting, vol. 2, Issue 8, Aug. 2013, pp. 24-32; 9 pages.

Makki, Ahmed, et al., "High Resolution Time of Arrival Estimation for OFDM-Based Transceivers," Institute of Engineering and Technology (IET), Oct. 2014, 3 pages.

International Search Report for International Application No. PCT/US19/021081 dated Apr. 8, 2019.

USPTO Final Rejection for U.S. Appl. No. 16/022,489 dated May 1, 2019; 34 pages.

Written Opinion for International Application No. PCT/US19/021081 dated Apr. 8, 2019.

International Search Report for International Application No. PCT/US19/15694 dated Mar. 5, 2019; 2 pages.

Written Opinion for International Application No. PCT/US19/15694 dated Mar. 5, 2019; 5 pages.

USPTO Advisory Action for U.S. Appl. No. 16/022,489 dated Aug. 1, 2019; 4 pages.

USPTO Non-Final Rejection for U.S. Appl. No. 16/022,489 dated Oct. 3, 2019; 22 pages.

USPTO Final Rejection for U.S. Appl. No. 16/022,489 dated Apr. 7, 2020, 19 pages.

* cited by examiner

COMMUNICATING PACKETS IN A MESH NETWORK

CROSS-REFERENCE TO RELATED APPLICATIONS

This application claims the benefit of U.S. Provisional Application No. 62/642,307 filed on Mar. 13, 2018 and claims the benefit of U.S. Provisional Application No. 62/642,445 filed on Mar. 13, 2018. The contents of each of the aforementioned applications are hereby incorporated by reference in their entireties.

BACKGROUND

Devices, such as computing devices or electronic devices are often connected to each other via networks (e.g., a computer network). A network may include wired or wireless infrastructure that may carry communications (e.g., data, messages, packets, frames, etc.) between devices that are part of the network. A network may be a public network (e.g., the internet), a private network (e.g., a personal area network (PAN), a local area network (LAN) or wide area network (WAN)), or a combination thereof.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, networks allow devices to communicate data with each other. For example, a wireless network may allow a device to transmit data to another device via a radio-frequency signal. Networks may use various protocols or standards. For example, a wireless network may use the Bluetooth protocol, formats, or standards. One type of network architecture may be a mesh network. A mesh network may be a network (e.g., a computer network, a wireless network, etc.) that has a network topology which includes various nodes (e.g., devices that form the network or that are within the network). In a mesh network, the nodes can communicate with each other directly and non-hierarchically. A sender node may use the other nodes of the mesh network to relay a packet (e.g., a message, a frame, etc.) to a receiver or recipient node, as discussed in more detail below. A mesh network may also use a flooding technique to relay packets between a sender and a receiver. The flooding technique may cause devices to use more bandwidth because redundant copies of packets may be transmitted even though the redundant copies do not help relay a packet to a receiver. In addition, the devices within the network may use more power because they are transmitting redundant copies of packets that do not help relay a packet to a receiver.

The examples, implementations, and embodiments described herein may allow a device (e.g. a node in a network) to wait a period of time after receiving a packet to see if another device will relay the packet. The duration of the period of time may be based on the strength of a radio-frequency signal. The stronger the radio-frequency signal, the longer the duration of time and vice versa. If the device determines that another device has relayed or transmitted the packet within the period of time, the device may refrain from transmitting (e.g., broadcasting or relaying) the packet. This may reduce the amount of bandwidth that is used in the network. This may also reduce the amount of power used by the device (e.g., reduce the power consumption) because the device may not transmit the redundant packet if another device has already transmitted the packet.

Figure 1:
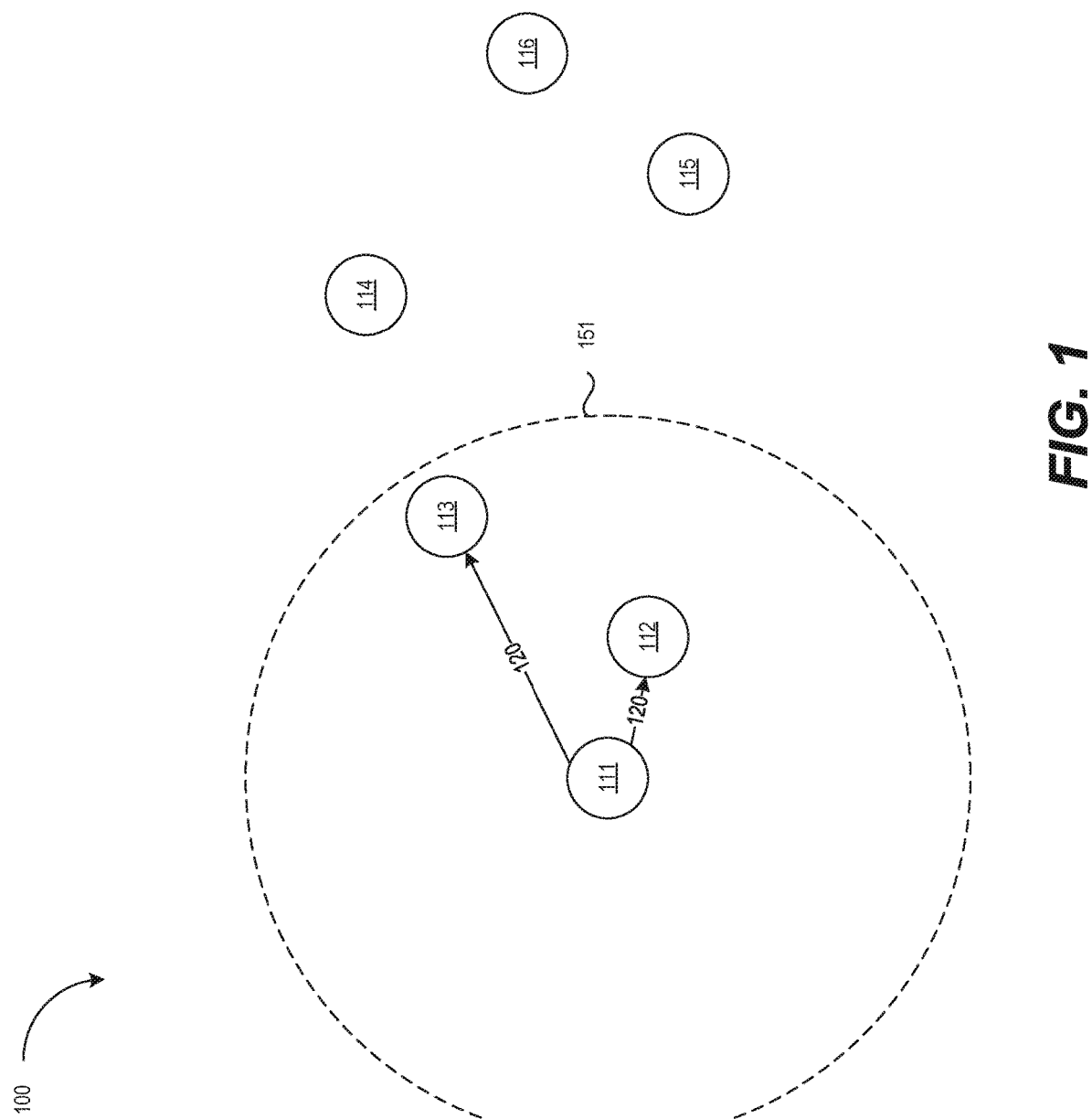
FIG. 1 illustrates an example network architecture, in accordance with some embodiments of the present disclosure.

FIG. 1 illustrates an example network architecture 100, in accordance with some embodiments of the present disclosure. The network architecture 100 includes node 111, node 112, node 113, node 114, node 115, and node 116. The network architecture 100 may carry communications (e.g., data, message, packets, frames, etc.) between the nodes 111, 112, 113, 114, 115, and 116 (e.g., electronic devices, network devices, computing devices, etc.). Although six nodes (e.g., nodes 111, 112, 113, 114, 115, and 116) are illustrated in FIG. 1, any appropriate number of nodes may be included in the network architecture 100, in other embodiments.

In one embodiment, the network architecture 100 may be a mesh network. A mesh network may be a network (e.g., a computer network, a wireless network, etc.) that has a network topology which includes various the nodes (e.g., devices that form the network or that are within the network). In a mesh network, the nodes can communicate with each other directly and non-hierarchically. For example, a node may directly transmit data or receive data from another node. A sender node may use the other nodes of the mesh network to relay a packet (e.g., a message, a frame, etc.) to a receiver node, as discussed in more detail below. In addition, the devices that are in a mesh network may be dynamically added to the network or removed from the network. For example, a node in a network may be a smartphone and the node may move out of range of the mesh network when a user carries the smartphone away. Furthermore, the nodes that are in a mesh network may be mobile. Thus, the configuration of the mesh network (e.g., the locations of the nodes, the number of nodes in the mesh network, etc.) may be constantly changing.

In one embodiment, the network architecture 100 may be a Bluetooth mesh network. A Bluetooth mesh network may be a wireless network that includes network devices which communicate using radio frequencies, protocols, standards, data formats, etc., that have been defined by the Bluetooth Special Interest Group (Bluetooth SIG). In some embodiments, the Bluetooth mesh network (e.g., the devices within the Bluetooth mesh network) may use the Bluetooth Low Energy standard.

In one embodiment, a node may be one or more devices that may communicate data (e.g., transmit data, receive data, etc.) with other nodes in the network architecture 100. For example, a node may be a computing device. A computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A computing device may comprise any suitable type of computing device or machine that has a programmable processor including, for example, server computers, desktop computers, laptop computers, tablet computers, smartphones, personal digital assistants (PDAs), set-top boxes, a smart watch, a camera (e.g., a security camera), a sensor (e.g., a smart thermometer), smart appliances (e.g., a smart refrigerator, a smart light bulb, etc.), fitness/health devices, etc. In some examples, the computing device may comprise a single machine or may include multiple interconnected machines (e.g., multiple servers configured in a cluster). The computing device may execute or include an operating system (OS). The OS of the computing device may manage the execution of other components (e.g., software, applications, etc.) and/or may manage access to the hardware (e.g., processors, memory, storage devices etc.) of the computing device.

In another example, a node may be an internet-of-things (IOT) device. An IOT device may allow a device (e.g., a computing device) to communicate with other devices (e.g., other computing devices). For example, an IOT device may allow a computing device to communicate data (e.g., transmit or receive messages, packets, frames, data, etc.) via a wireless infrastructure. In one embodiment, an IOT device may be a network interface for the computing device. For example, the IOT device may be a network adaptor that may be able to transmit and receive radio-frequency signals. In some embodiments, the IOT device may be part of another device, such as a computing device. For example, the IOT device may be installed or located within a housing of a computing device. In other embodiments, the IOT device may be separate from the other device. For example, the IOT device may be a network interface that may be plugged into a universal serial bus (USB) port of a computing device.

In one embodiment, a node may include a transceiver (e.g., a Bluetooth transceiver) that may allow the node to transmit and/or receiver radio-frequency signals. A transceiver may be a single component/device or may be divided into separate components/devices. For example, a transceiver may include a transmitter and a separate receiver.

As discussed above, the network architecture 100 may be a mesh network (e.g., a Bluetooth mesh network). The node 111 may have a packet 120 (e.g., a message, a frame, a data unit, a datagram, or other data) to transmit to node 116. Because the network architecture 100 is a mesh network, the node 111 may transmit the packet 120 by broadcasting the packet 120 (e.g., transmit the packet 120) to all nodes within range of the node 111. For example, the node 111 may transmit the packet 120 to all nodes that are close enough to node 111 to receive radio-frequency signals transmitted by the node 111. A transmitting node may use other nodes within the network architecture 100 to relay a packet to a recipient node by broadcasting the packet.

The circle 151 illustrated in FIG. 1 may represent the range of the radio-frequency signals transmitted by the node 111. Nodes that are located within the circle 151 may be able to receive radio-frequency signals or data transmitted by the node 111. As illustrated in FIG. 1, nodes 112 and 113 are within the circle 151 (e.g., within range of the node 111). Thus, the packet 120 may be received by nodes 112 and 113 (e.g., the node 111 may broadcast the packet 120 to nodes 112 and 113).

In some embodiments, a mesh network may communicate data between the nodes using a flood/flooding technique or protocol. When a first node wants to transmit a packet (e.g., a message, a frame, data, etc.) to a second node, the first node may broadcast the packet to all nodes that within range of the first node. For example node 111 may broadcast the packet 120 to all nodes within range of node 111 (e.g., to nodes 112 and 113). Each node that receives the packet may also broadcast the packet (e.g., retransmit the packet) to other nodes that are within range. This allows the packet to be "flooded" or relayed through the mesh network and allows the packet to be transmitted from the first node to the second node. A node may store data indicating which packets have been previously transmitted. For example, a node may store data indicating the last three, ten, or some appropriate number of packets that the node transmitted. In another example, the node may store data indicating which packets were transmitted in the last minute, hour, or some appropriate time period. If a node receives a packet and the node has previously transmitted the packet, the node will not re-transmit the packet. This may help prevent the looping of packets around in the mesh network.

Figure 2:
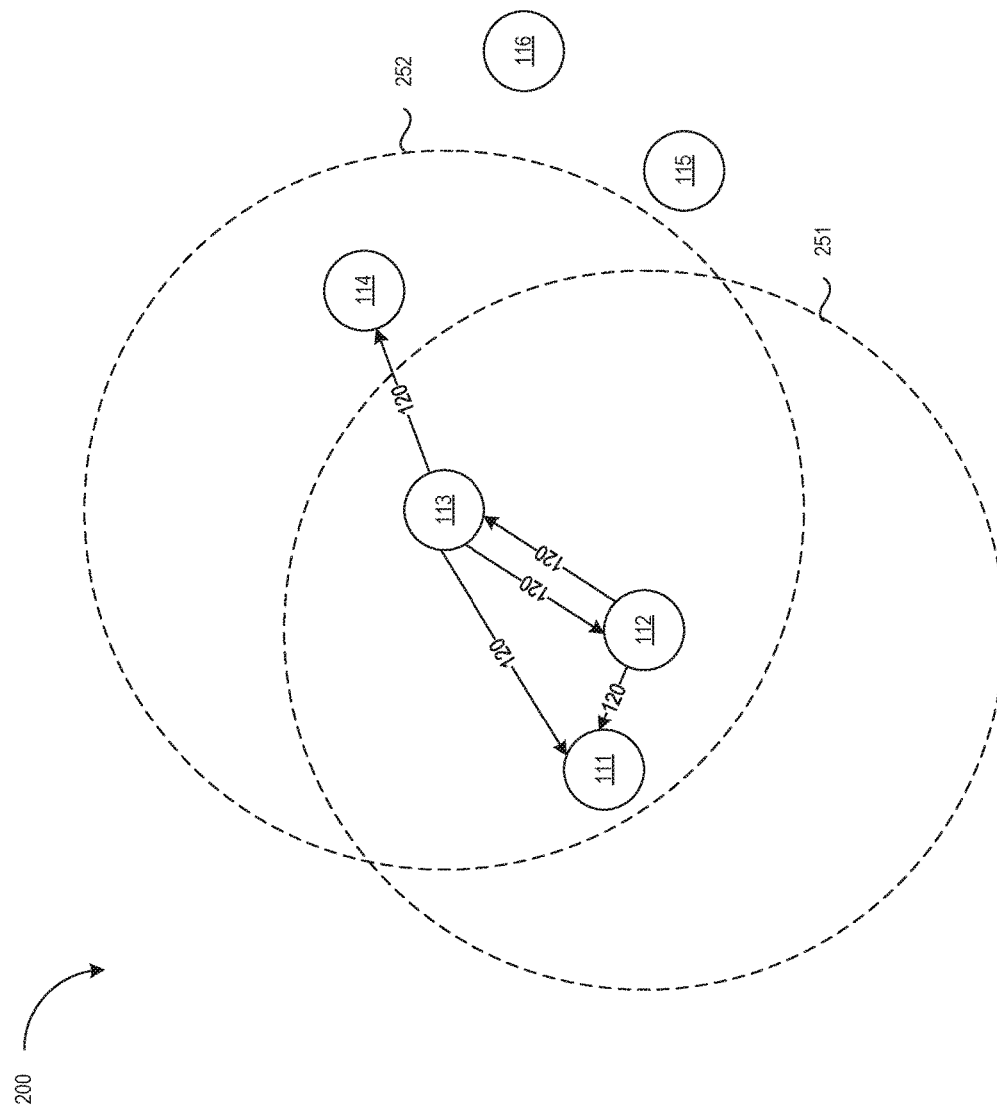
FIG. 2 illustrates an example network architecture, in accordance with some embodiments of the present disclosure.

FIG. 2 illustrates an example network architecture 200, in accordance with some embodiments of the present disclosure. The network architecture 200 includes node 111, node 112, node 113, node 114, node 115, and node 116. The network architecture 200 may carry communications between the nodes 111, 112, 113, 114, 115, and 116. Although six nodes (e.g., nodes 111, 112, 113, 114, 115, and 116) are illustrated in FIG. 2, any appropriate number of nodes may be included in the network architecture 200, in other embodiments. In one embodiment, the network architecture 200 may be a mesh network, as discussed above. For example, the network architecture 200 may be a Bluetooth mesh network. In one embodiment, a node may be one or more devices that may communicate data (e.g., transmit data, receive data, etc.) with other nodes in the network architecture 200, as discussed above. For example, a node may be a computing device. In another example, a node may be an internet-of-things (IOT) device.

As discussed above, the network architecture 200 may be a mesh network (e.g., a Bluetooth mesh network). A mesh network may communicate data between the nodes using a flood/flooding technique or protocol. Referring to FIG. 1, the node 111 may transmit (e.g., broadcast) packet 120 to nodes 112 and 113. As illustrated in FIG. 2, nodes 112 and 113 have received packet 120. Nodes 112 and 113 may each determine whether they have previously transmitted packet 120. For example, nodes 112 and 113 may check data (e.g., a table, a list, etc.) stored in a memory to determine whether nodes 112 and 113 previously transmitted packet 120. In another example, the nodes 112 and 113 may use an identifier (e.g., a sequence number, a hash of the packet 120, etc.) to determine whether the nodes 112 and 113 previously transmitted packet 120. In FIG. 2, the nodes 112 and 113 have not previously transmitted packet 120. Because the network architecture 200 is a mesh network, the nodes 112 and 113 may transmit a packet 120 by broadcasting the packet 120 (e.g., transmit the packet 120) to all nodes within range of the nodes 112 and 113.

The circle 251 may represent the range of the radio-frequency signals transmitted by the node 112 and the circle 252 may represent the range of the radio-frequency signals transmitted by the node 113. Nodes that are located within the circle 251 may be able to receive radio-frequency signals or data transmitted by the node 112 and nodes that are located within the circle 252 may be able to receive radio-frequency signals or data transmitted by the node 113. As illustrated in FIG. 2, nodes 111 and node 113 are within the circle 251 (e.g., within range of the node 112). Also as illustrated in FIG. 2, nodes 111, 112, and 114 are within the circle 252 (e.g., within range of node 113). Thus, the packet 120 may be received by nodes 111, 112, 113, and 114.

Figure 3:
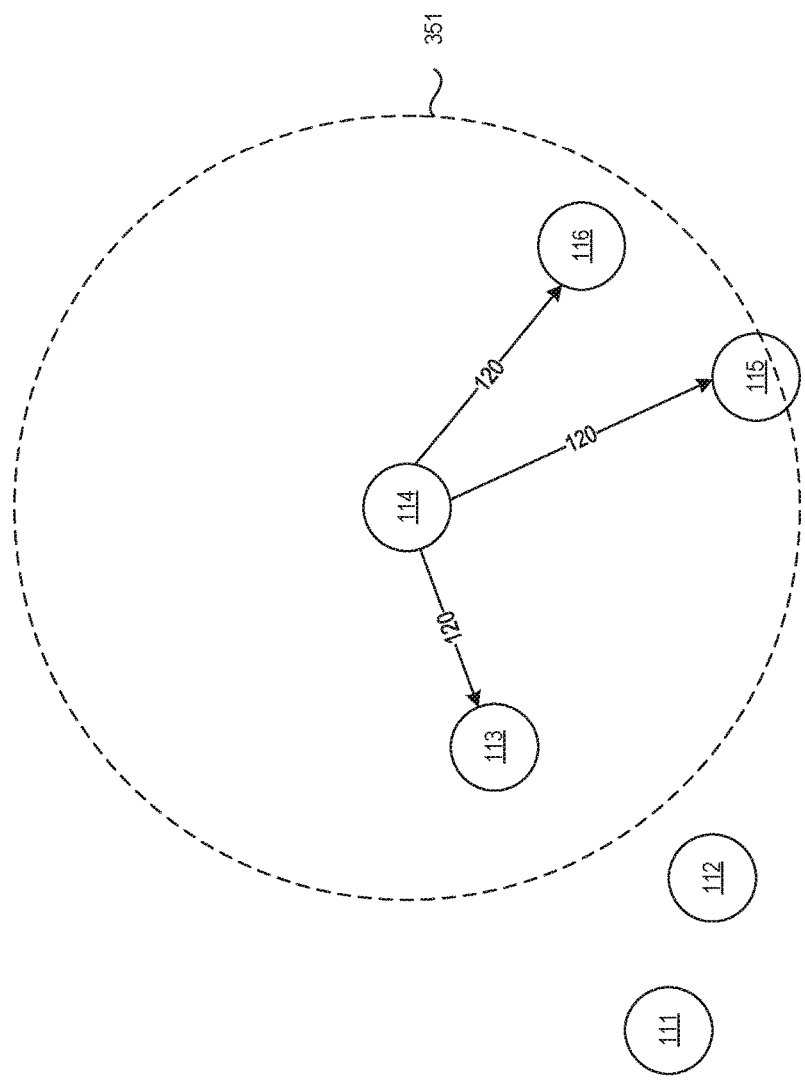
FIG. 3 illustrates an example network architecture, in accordance with some embodiments of the present disclosure.

FIG. 3 illustrates an example network architecture 300, in accordance with some embodiments of the present disclosure. The network architecture 300 includes node 111, node 112, node 113, node 114, node 115, and node 116. The network architecture 300 may carry communications between the nodes 111, 112, 113, 114, 115, and 116. Although six nodes (e.g., nodes 111, 112, 113, 114, 115, and 116) are illustrated in FIG. 3, any appropriate number of nodes may be included in the network architecture 300, in other embodiments. In one embodiment, the network architecture 300 may be a mesh network, as discussed above. For example, the network architecture 300 may be a Bluetooth mesh network. In one embodiment, a node may be one or more devices that may communicate data (e.g., transmit data, receive data, etc.) with other nodes in the network architecture 300, as discussed above. For example, a node may be a computing device. In another example, a node may be an internet-of-things (IOT) device.

As discussed above, the network architecture 300 may be a mesh network (e.g., a Bluetooth mesh network). A mesh network may communicate data between the nodes using a flood/flooding technique or protocol. Referring to FIG. 2, nodes 112 and 113 transmitted (e.g., broadcasted) packet 120 to nodes 111, 112, 113, and 114. As illustrated in FIG. 2, nodes 112, 113, and 114 may receive packet 120. Nodes 112, 113, and 114 may each determine whether they have previously transmitted packet 120 (e.g., may use an identifier for the packet 120 and a list, table, etc.). In FIG. 3, the nodes 111, 112, and 113 have previously transmitted packet 120. Thus, nodes 111, 112, and 113 may refrain from transmitting (e.g., retransmitting or broadcasting) packet 120. Node 114 has not previously transmitted packet 120. Because the network architecture 300 is a mesh network, the node 114 may transmit the packet 120 by broadcasting the packet 120 (e.g., transmit the packet 120) to all nodes within range of node 114.

The circle 351 may represent the range of the radio-frequency signals transmitted by the node 114. Nodes that are located within the circle 351 may be able to receive radio-frequency signals or data transmitted by the node 114. As illustrated in FIG. 3, nodes 113, 115, and 116 are within the circle 351 (e.g., within range of the node 114). Thus, the packet 120 may be received by nodes 113, 115, and 116. As discussed above, node 116 may be the intended recipient of the packet 120 (e.g., the packet 120 may be addressed to or may include an identifier for the node 116).

As illustrated in FIGS. 1 through 3, nodes 111, 112, 113, and 114 each transmitted the packet 120. This may result in unnecessary redundant transmissions or copies of the packet 120 being transmitted (e.g., broadcasted) through the network architecture (e.g., through a mesh network). Redundant transmissions of packets may result in less network bandwidth in the network architecture because nodes are using the network bandwidth to transmit the redundant packets. In addition, nodes may consume more power because they are transmitting redundant copies of the packet 120 when the redundant copies of packet 120 may not be needed to relay the packet 120 to the intended recipient (e.g., to node 116).

Figure 4:
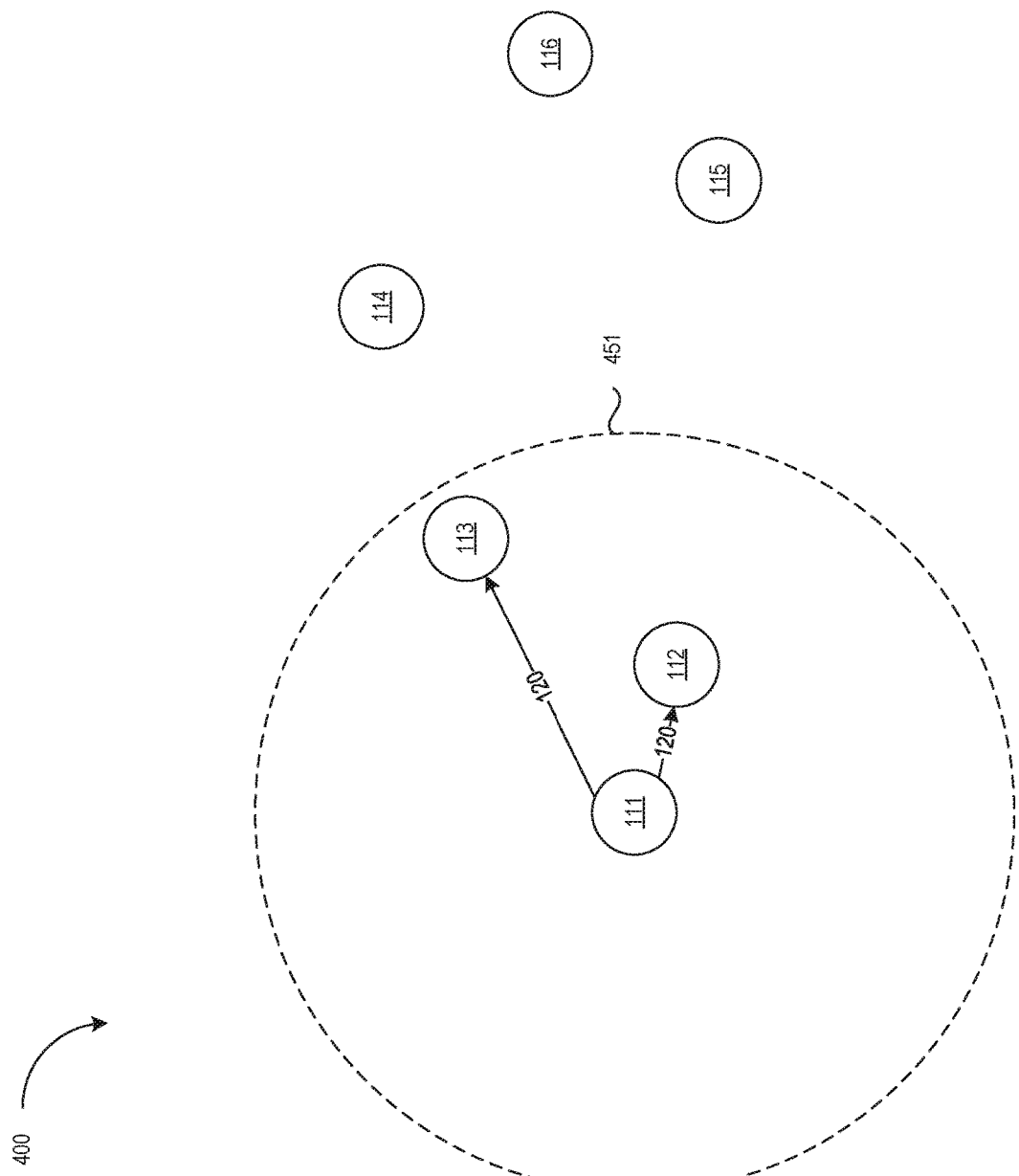
FIG. 4 illustrates an example network architecture, in accordance with some embodiments of the present disclosure.

FIG. 4 illustrates an example network architecture, in accordance with some embodiments of the present disclosure. The network architecture 400 includes node 111, node 112, node 113, node 114, node 115, and node 116. The network architecture 400 may carry communications between the nodes 111, 112, 113, 114, 115, and 116. Although six nodes (e.g., nodes 111, 112, 113, 114, 115, and 116) are illustrated in FIG. 4, any appropriate number of nodes may be included in the network architecture 400, in other embodiments. In one embodiment, the network architecture 400 may be a mesh network, as discussed above. For example, the network architecture 400 may be a Bluetooth mesh network. In one embodiment, a node may be one or more devices that may communicate data (e.g., transmit data, receive data, etc.) with other nodes in the network architecture 400, as discussed above. For example, a node may be a computing device. In another example, a node may be an internet-of-things (IOT) device.

As discussed above, the network architecture 400 may be a mesh network (e.g., a Bluetooth mesh network). Because the network architecture 400 is a mesh network, the node 111 may transmit the packet 120 by broadcasting the packet 120 (e.g., transmit the packet 120) to all nodes within range of node 111. The circle 451 may represent the range of the radio-frequency signals transmitted by the node 111. Nodes that are located within the circle 451 may be able to receive radio-frequency signals or data transmitted by the node 111. As illustrated in FIG. 4, nodes 112 and 113 are within the circle 451 (e.g., within range of the node 111). Thus, the packet 120 may be received by nodes 112 and 113.

Figure 5:
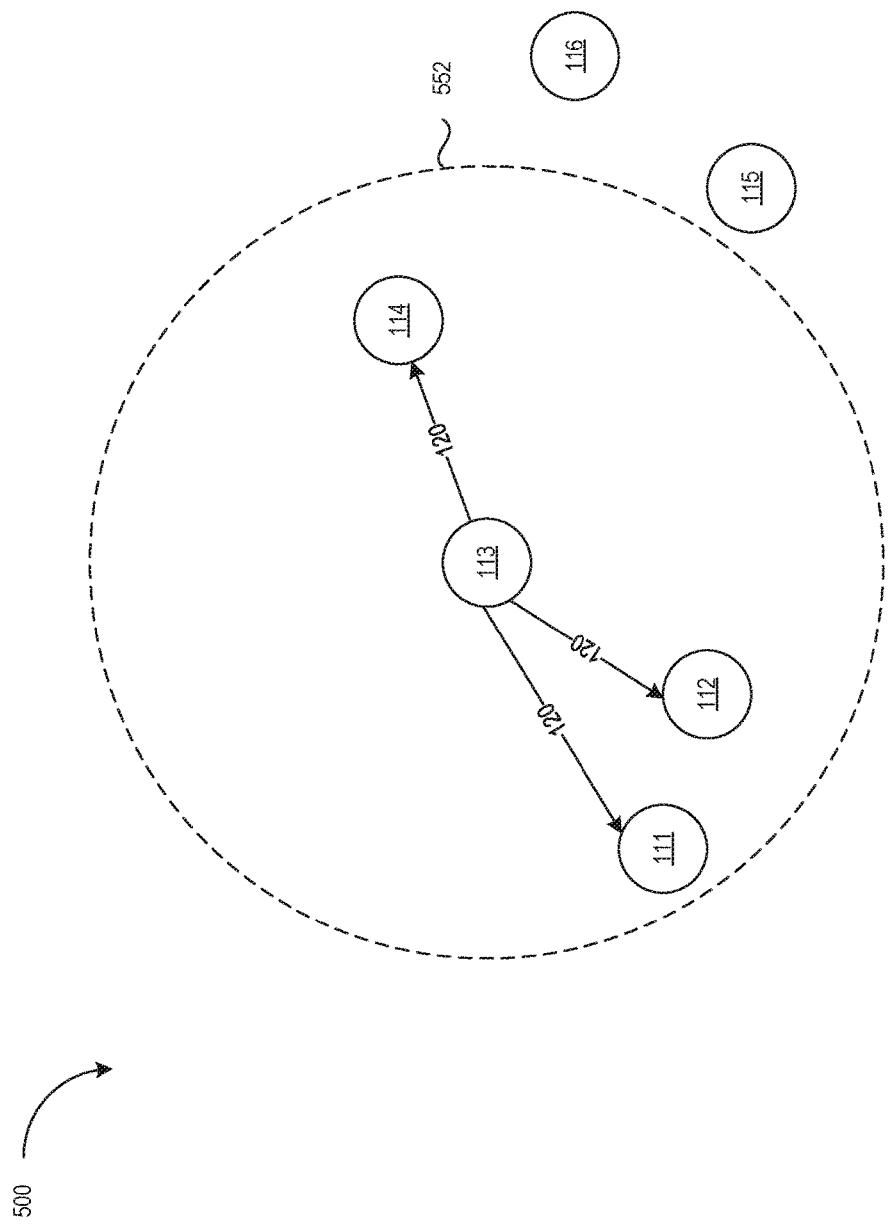
FIG. 5 illustrates an example network architecture, in accordance with some embodiments of the present disclosure.

FIG. 5 illustrates an example network architecture, in accordance with some embodiments of the present disclosure. The network architecture 500 includes node 111, node 112, node 113, node 114, node 115, and node 116. The network architecture 500 may carry communications between the nodes 111, 112, 113, 114, 115, and 116. Although six nodes (e.g., nodes 111, 112, 113, 114, 115, and 116) are illustrated in FIG. 5, any appropriate number of nodes may be included in the network architecture 500, in other embodiments. In one embodiment, the network architecture 500 may be a mesh network, as discussed above. For example, the network architecture 500 may be a Bluetooth mesh network. In one embodiment, a node may be one or more devices that may communicate data (e.g., transmit data, receive data, etc.) with other nodes in the network architecture 500, as discussed above. For example, a node may be a computing device. In another example, a node may be an internet-of-things (IOT) device.

As discussed above, the network architecture 500 may be a mesh network (e.g., a Bluetooth mesh network). Referring to FIG. 4, the node 111 may transmit (e.g., broadcast) packet 120 to nodes 112 and 113. As illustrated in FIG. 5, nodes 112 and 113 may receive packet 120. Nodes 112 and 113 may each determine whether they have previously transmitted packet 120 (e.g., using an identifier for the packet 120 and a table/list). In FIG. 2, the nodes 112 and 113 have not previously transmitted packet 120.

In one embodiment, nodes 112 and node 113 may determine the strength (or a measure/indication of the strength) of the radio-frequency signal (that was used to transmit packet 120) received from node 111. For example, nodes 112 and 113 may each determine (e.g., measure) a received signal strength indication (RSSI) for the radio-frequency signal received from node 111. Although the present disclosure may refer to RSSI, other embodiments may user other units, measurements, etc., to indicate or represent the strength of the radio-frequency signal. In addition, various others techniques, methods, algorithms, functions, etc., may be used to determine the strength (or a measure/indication of the strength) of the radio-frequency signal, the ability for one node to transmit a radio-frequency signal or data to another node, or the distance between two nodes in other embodiments. For example, a node may determine the error rate in data that is received from a transmitting node. A higher error rate may indicate that the radio-frequency signal received by a receiving node from the transmitting node is weaker, that the transmitting node has less ability to transmit a radio-frequency signal to the receiving node, or that the transmitting node is farther away from the receiving node, and vice versa. In another example, a higher or larger RSSI may indicate that the radio-frequency signal received by a receiving node from the transmitting node is stronger, that the transmitting node has more ability to transmit a radio-frequency signal to the receiving node, or that the transmitting node is closer to the receiving node, and vice versa.

In one embodiment, nodes 112 and 113 may each determine a time period based on the strength (e.g., or a measure/indication of the strength, such as RSSI) of the radio-frequency signal received from node 111. The duration of the time may be correlated with the strength (or the measure of the strength) of the radio-frequency signal (e.g., may be directly correlated, linearly correlated, cubicly correlated, etc.). For example, the stronger the strength (or the measure of the strength) of the radio-frequency signal, the longer the duration of time. In another example, the weaker the strength (or the measure of the strength) of the radio-frequency signal, the shorter the duration of time. By waiting a longer period of time if the radio-frequency signal is stronger, this may allow nodes that are father away from node 111 (and may be closer to the recipient node) to re-transmit or re-broadcast packet 120 first. If the nodes that are farther away re-transmit or re-broadcast packet 120 first, the nodes that are closer to node 111 may refrain from re-transmitting or re-broadcasting packet 120, as discussed in more detail below.

In some embodiments, the time period may be based on a function of the strength (or the measure of the strength) of the radio-frequency signal. For example, the time period may be calculated based on a linear function, a cubic function, a quintic function, etc., of the strength (or the measure of the strength) of the radio-frequency signal. Equation (1) below illustrates an example equation or function which may be used to determine the time period:

$$\text{time\_period} = (\text{signal\_strength} + \text{sen})/K \quad (1)$$

where the time_period is the duration of the time period in milliseconds (ms), where signal_strength is the strength or the measure of the strength of the radio-frequency signal expressed as an RSSI value (in decibels (db)), where sen is the sensitivity of the one or more antennas of a node, and where K is a scaling factor. Equation (1) is provided as merely one example of a function/equation that may be used to determined or calculate the time period or duration of the time period. Other functions or equations may be used in other embodiments.

In other embodiments, the time period (e.g., the duration of the time period) may be determined based on a list or table. For example, table 1 below indicates example time periods for different ranges of RSSI values (e.g., strengths of radio-frequency signals). A node (e.g., node 112) may store data indicative of the RSSI values and time periods illustrated in Table 1. A node may determine or select the time period based on the example ranges of RSSI values and example time periods illustrated in table 1.

TABLE 1

| RSSI Value | Time Period |
|---|---|
| >−30 db | 500 ms |
| −31 db to −50 db | 400 ms |
| −51 db to −70 db | 300 ms |
| −71 db to −90 db | 200 ms |
| <−91 db | 100 ms |

As illustrated in FIG. 5, node 112 is closer to node 111 than node 113. Because node 112 is closer to node 111, the strength (or the measure of the strength) of the radio-frequency signal detected by node 112 may be stronger than the strength of the radio-frequency signal detected by node 113. As discussed above, the stronger the strength of the radio-frequency signal, the longer the time period (e.g., duration of time) and the weaker the strength of the radio-frequency signal, the shorter the time period. Thus, node 112 may determine a first period of time that is longer than a second period of time determined by the node 113. In one embodiment, the nodes 112 and 113 may wait for their respective time periods to determine if the packet 120 is received again (e.g., to determine whether another copy of the packet 120 is received). For example, node 112 may determine that the radio-frequency signal from node 111 has an RSSI value of −45 db and may wait 400 ms to see if another copy of the packet 120 is received in the 400 ms (e.g., during the time period of 400 ms). Node 113 may determine that the radio-frequency signal from node 111 has an RSSI value of −93 db and may wait 100 ms to see if another copy of the packet 120 is received in the 100 ms (e.g., during the time period of 100 ms). After 100 ms, the node 113 determines that packet 120 has not been received again (e.g., another copy of packet 120 has not been received).

In one embodiment, the node 112 may determine whether another copy of the packet 120 is received by comparing the payloads (e.g., the payload portion, the data portion, etc.) of the packets. For example, as nodes re-broadcast or re-transmit packets to other nodes to relay a packet from a sender to a receiver, the headers and/or footers of the packets may change. The headers and/or footers may be changed to indicate identifying information of a transmitting node, how many times the packet was re-transmitted or re-broadcasted, etc. Although headers/footers of packets may change, the node may determine that another copy of a packet was received if the payload of a first packet matches the payload of a second packet.

The node 113 may transmit (e.g., broadcast) the packet 120 in response to determining that the packet 120 has not been received again during the 100 ms (e.g., during the time period). Because node 112 is within range of the node 113 (as illustrated by circle 552), node 113 will receive packet 120 again from node 112. As discussed above, node 112 may wait for 400 ms to determine if the packet 120 is received again. Because node 112 waits for a longer period of time than node 113 (e.g., waits for 400 ms rather than 100 ms), node 112 is still within the time period of 400 ms when it receives the packet 120 from the node 113. When node 112 determines that the packet 120 was received again from the node 113, node 112 may refrain from transmitting the packet 120. For example, node 112 may decide that the packet 120 should not be broadcasted to the mesh network in response to determining that the packet 120 was received again within the time period of 400 ms.

The circle 552 may represent the range of the radio-frequency signals transmitted by the node 113. Nodes that are located within the circle 552 may be able to receive radio-frequency signals or data transmitted by the node 113. As illustrated in FIG. 5, nodes 111, 112, and 114 are within the circle 552 (e.g., within range of the node 113). Thus, the packet 120 may be received by nodes 111, 112, and 114.

Figure 6:
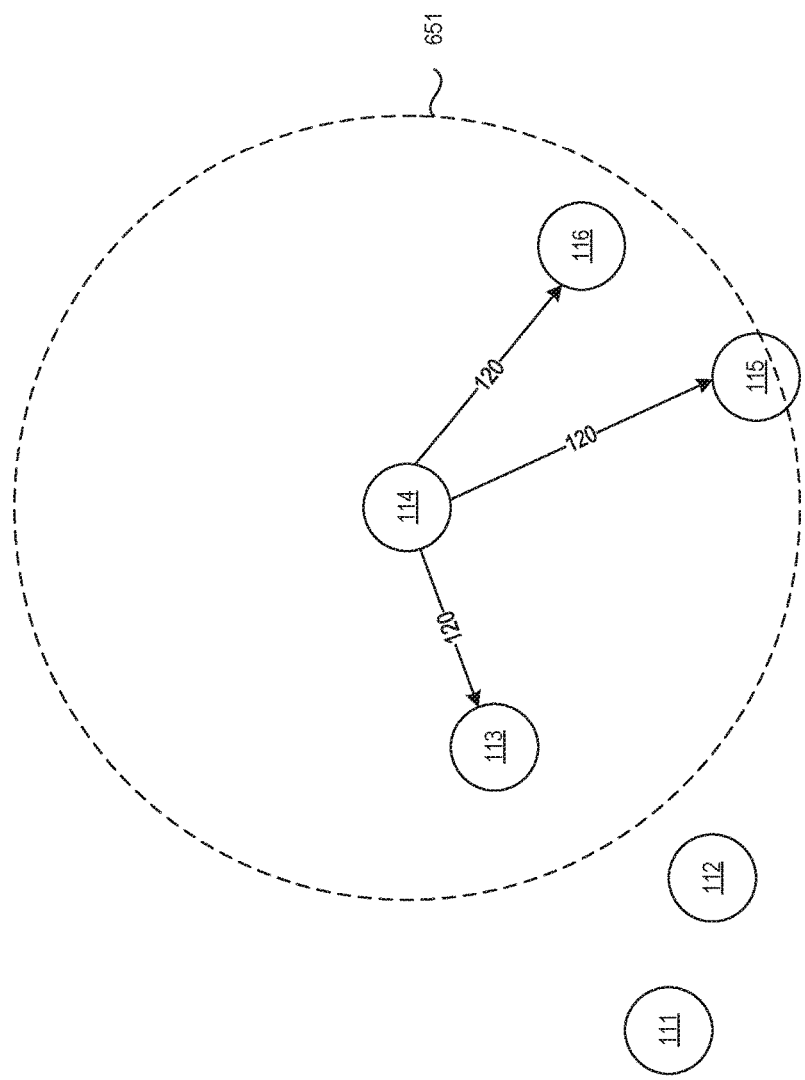
FIG. 6 illustrates an example network architecture, in accordance with some embodiments of the present disclosure.

FIG. 6 illustrates an example network architecture 600, in accordance with some embodiments of the present disclosure. The network architecture 600 includes node 111, node 112, node 113, node 114, node 115, and node 116. The network architecture 600 may carry communications between the nodes 111, 112, 113, 114, 115, and 116. Although six nodes (e.g., nodes 111, 112, 113, 114, 115, and 116) are illustrated in FIG. 6, any appropriate number of nodes may be included in the network architecture 600, in other embodiments. In one embodiment, the network architecture 600 may be a mesh network, as discussed above. For example, the network architecture 600 may be a Bluetooth mesh network. In one embodiment, a node may be one or more devices that may communicate data (e.g., transmit data, receive data, etc.) with other nodes in the network architecture 600, as discussed above. For example, a node may be a computing device. In another example, a node may be an internet-of-things (IOT) device.

As discussed above, the network architecture 600 may be a mesh network (e.g., a Bluetooth mesh network). Referring to FIG. 6, node 114 may transmit (e.g., broadcast) packet 120 to nodes 113, 115, and 116. The circle 651 may represent the range of the radio-frequency signals transmitted by the node 114. Nodes that are located within the circle 651 may be able to receive radio-frequency signals or data transmitted by the node 114. As illustrated in FIG. 6, nodes 113, 115, and 116 are within the circle 351 (e.g., within range of the node 114). Thus, the packet 120 may be received by nodes 113, 115, and 116. As discussed above, node 116 may be the intended recipient of the packet 120 (e.g., the packet 120 may be addressed to or may include an identifier for the node 116).

As discussed above in FIGS. 1 through 3, nodes 111, 112, 113, and 114 each transmitted the packet 120. This may result in many redundant transmissions or copies of the packet 120 being transmitted (e.g., broadcasted) through the network architecture (e.g., through a mesh network). Redundant transmissions of packets may result in less network bandwidth in the network architecture because nodes are using the network bandwidth to transmit the redundant packets. For example, referring to FIGS. 1 through 3, ten copies of packet 120 were transmitted in order to transmit packet 120 from node 111 to node 116. However, referring to FIGS. 4-6, eight copies of packet 120 were transmitted in order to transmit packet 120 from node 111 to 116. Because node 112 waited for a time period to see if another node (e.g., node 113) that may be closer to the recipient node (e.g., node 116) would transmit the packet 120, the node 112 was able to refrain from transmitting redundant copies of packet 120. This may allow less network bandwidth to be used by the nodes.

In addition, because node 112 did not transmit redundant copies of packet 120, node 112 was able to use less power. By waiting for a time period to see if another node may transmit a packet, a node may be able to save power because the node may refrain from transmitting the packet if another node has already transmitted the packet.

In the embodiments, examples, and implementations discussed herein, the packet that a node may receive and the packet that the node may transmit, re-transmit, broadcast, re-broadcast, forward, relay, etc., may not be completely identical. For example, a node may receive a packet and may determine whether another copy of the packet was received during a time period based on the payloads of the packets, as discussed above. If the node determines that another copy of the packet was not received during the time period, the node may re-transmit or re-broadcast a second packet that has the same payload as the received packet. The headers and/or footers of the second packet may different from the headers and/or footers of the received packet.

In some embodiments, the network architectures 400, 500, and 600 (illustrated in FIGS. 4 through 6) may include nodes that may determine a time period based on a measure of a strength of a radio-frequency signal and wait for the time period to determine whether another copy of a packet is received, and may also include one or more nodes that may not perform those operations, actions, functions, etc. For example, the network architectures 400, 500, and 600 may include additional nodes (not illustrated in FIGS. 4 through 6) which may re-broadcast or retransmit packets without determining a time period based on a measure of a strength of a radio-frequency signal and without waiting for the time period. The nodes that may perform the operations, actions, and functions, etc., described herein may operate in conjunction with nodes that do not perform the operations, actions, and functions, etc., described herein.

Figure 7:
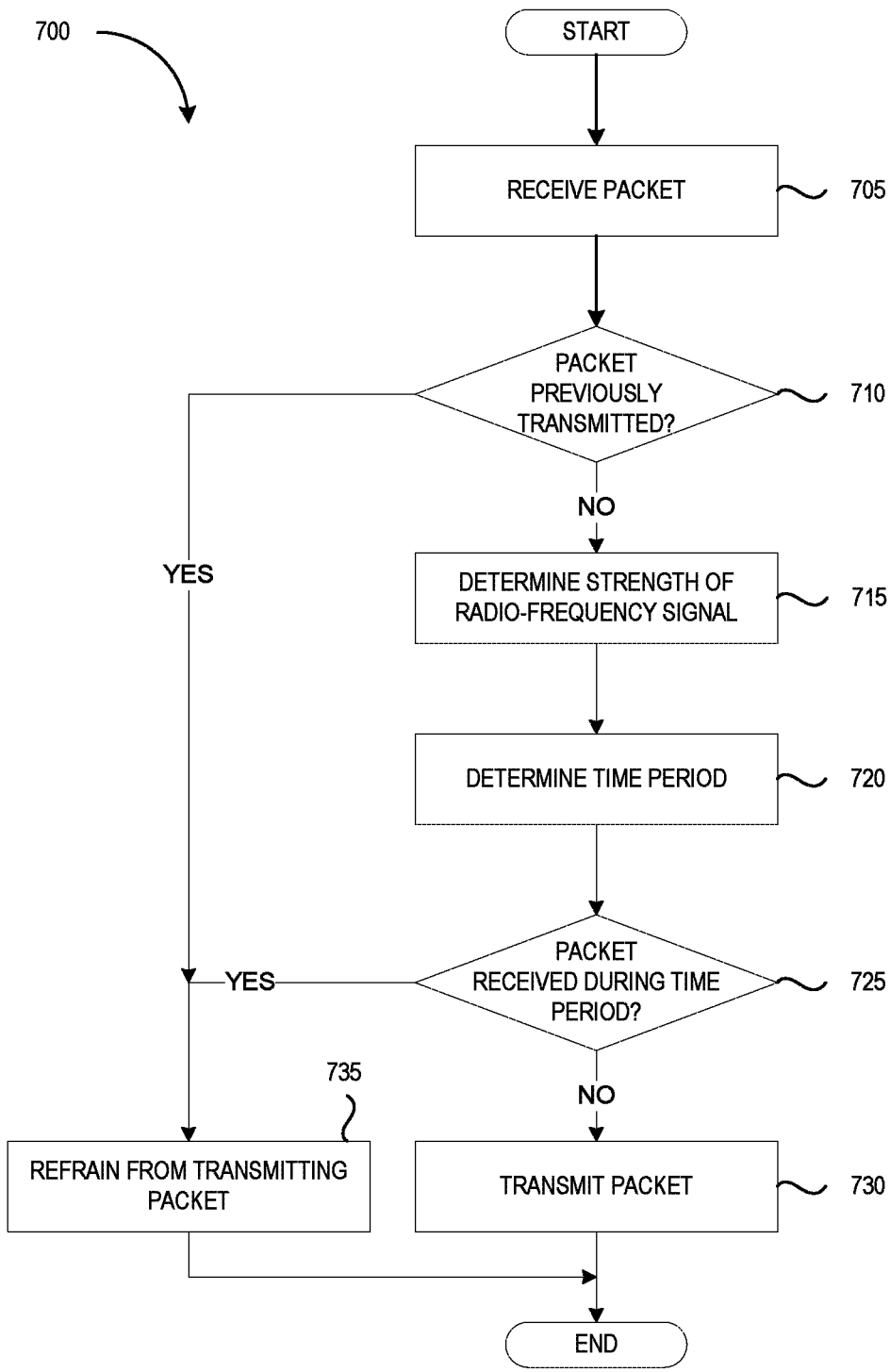
FIG. 7 is a flow diagram of a method of communicating data in a mesh network, in accordance with some embodiments of the present disclosure.

FIG. 7 is a flow diagram of a method 700 of communicating data in a mesh network, in accordance with some embodiments of the present disclosure. Method 700 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 700 may be performed by a node (e.g., node 113 illustrated in FIG. 5), a computing device (e.g., device 800 illustrated in FIG. 8), an IOT device, or a processing device (e.g., processing device 802 illustrated in FIG. 8).

The method 700 begins at block 705, where the method 700 receives a packet. For example, a packet may be received via a radio-frequency signal transmitted by a node in a mesh network. At block 710, the method determines whether the packet was previously transmitted. For example, the method 700 may use an identifier (e.g., a sequence number) for the packet and a table to determine whether the packet was previously transmitted. If the packet was previously transmitted the method 700 may refrain from transmitting (e.g., re-transmitting, broadcasting, etc.) the packet. If the packet was not previously transmitted, the method 700 proceeds to block 715.

At block 715, the method 700 determines the strength of a measure of the strength of the received radio-frequency signal. For example, the method 700 may determine an RSSI value that may represent the strength of the radio-frequency signal. The method 700 may determine a time period based on the strength of the radio-frequency signal. For example, the method 700 may use a function (e.g., equation (1) illustrated above) or may use a table (e.g., table 1 illustrated above) to determine a time period based on the strength of the radio-frequency signal.

At block 725, the method 700 may wait for the time period (e.g., wait for a duration of time) to determine whether another copy of the packet was received during the time period (e.g., to determine whether the packet was received again during the time period). For example, the method 700 may wait 2 seconds, 500 ms, or some other appropriate period of time to determine whether another device will transmit the packet. If another copy of the packet was not received during the time period, the method 700 may transmit the packet at block 730. If another copy of the packet was received during the time period, the method 700 may refrain from transmitting the packet (e.g., may not transmit the packet) at block 735.

Although the present disclosure may refer to Bluetooth, other wireless protocols, standards, formats, and/or technologies may be used in other embodiments. For example, the nodes and/or the networks described herein may use the radio-frequencies, formats, protocols, defined by one or more of the 802.11 standards, Wi-Fi standard, 802.15.4 standard, the Zigbee standard, the Z-Wave standard, etc.

Figure 8:
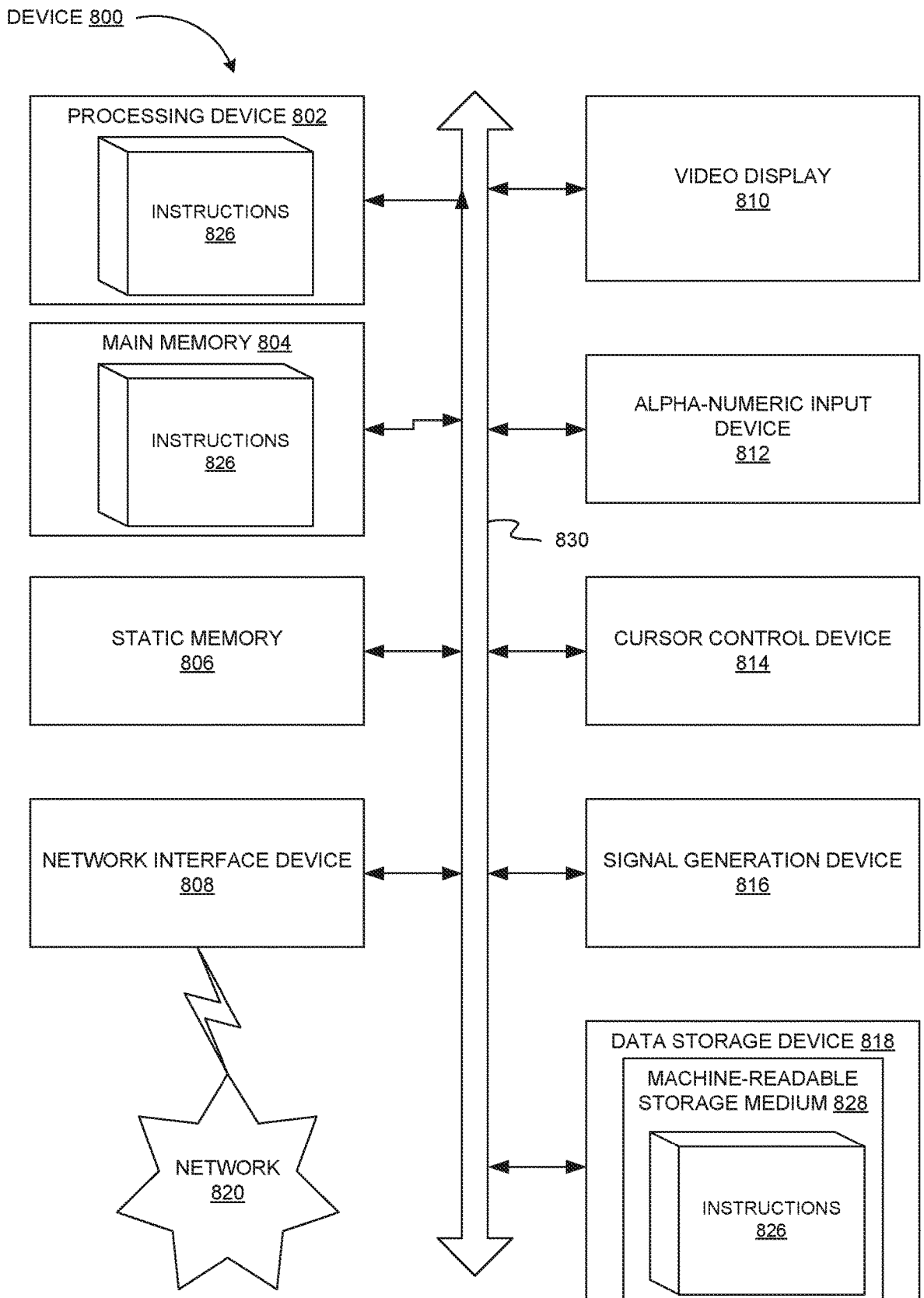
FIG. 8 is a block diagram of an example device that may perform one or more of the operations described herein, in accordance with some embodiments of the present disclosure.

FIG. 8 is a block diagram of an example device 800 that may perform one or more of the operations described herein, in accordance with some embodiments. Device 800 may be connected to other devices in a LAN, an intranet, an extranet, and/or the Internet. The device may operate in the capacity of a server machine in client-server network environment or in the capacity of a client in a peer-to-peer network environment. The device may be an electronic or computing device (such as a personal computer (PC), a tablet computer, a PDA, a smartphone, a set-top box (STB), a server computer, etc.), a network device (such as a router, switch or bridge), or any machine capable of executing a set of instructions (sequential or otherwise) that specify actions to be taken by that machine. Further, while only a single device is illustrated, the term "device" shall also be taken to include any collection of devices that individually or jointly execute a set (or multiple sets) of instructions to perform the methods discussed herein. In one embodiment, the device 800 may be a node, as illustrated and discussed above in FIGS. 1 through 7. In other embodiments, the device 800 may include a subset of the components illustrated in FIG. 8 (e.g., not all of the components illustrated in FIG. 8 may be present in the device 800). For example, the device 800 may include the processing device 802, the network interface 808, and data storage device 818.

The example device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Device 800 may further include a network interface device 808 which may communicate with a network 820. The device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions for carrying out the operations described herein, in accordance with one or more aspects of the present disclosure. Instructions implementing instructions 826 for one or more of a profiling component or a security component may also reside, completely or at least partially, within main memory 804 and/or within processing device 802 during execution thereof by device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In some embodiments, the example device 800 may include a subset of the components illustrated in FIG. 6. For example, the example device 800 may include the processing device, the main memory 804 (or other type or data storage device, such as a persistent data storage device), and the network interface device 808.

Unless specifically stated otherwise, terms such as "receiving," "determining," "transmitting," "refraining," "broadcasting," "calculating," "generating," "selecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
a Bluetooth™ transceiver configured to receive a packet transmitted to a Bluetooth™ mesh network via a radio-frequency signal;
a processing device coupled to the Bluetooth™ transceiver, the processing device configured to:
determine a measure of strength of the radio-frequency signal;
determine a time period to wait to receive the packet again based on at least the measure of strength of the radio-frequency signal;
determine whether the packet was received again during the time period; and
transmit the packet to relay the packet to the Bluetooth™ mesh network in response to determining that the packet was not received again during the time period.

2. The apparatus of claim 1, wherein the processing device is further configured to:
refrain from transmitting the packet to the Bluetooth™ mesh network in response to determining that the packet was received again during the time period.

3. The apparatus of claim 1, wherein the Bluetooth™ mesh network comprises a plurality of Bluetooth™ devices and wherein packets are communicated by relaying the packets via the plurality of Bluetooth™ devices.

4. The apparatus of claim 3, wherein to transmit the packet, the processing device is further configured to:
broadcast the packet to the plurality of Bluetooth™ devices of the Bluetooth™ mesh network.

5. The apparatus of claim 1, wherein to determine the measure of strength of the radio-frequency signal, the processing device is further configured to:
determine a received signal strength indication (RSSI) for the radio-frequency signal.

6. The apparatus of claim 1, wherein a duration of the time period is correlated with the measure of strength of the radio-frequency signal.

7. The apparatus of claim 1, wherein to determine the time period, the processing device is further configured to:
calculate the time period based on a function of the measure of strength of the radio-frequency signal.

8. The apparatus of claim 1, wherein to determine the time period, the processing device is further configured to:
select the time period from a plurality of time periods, wherein the plurality of time periods is associated with a plurality of ranges of strengths of the radio-frequency signal.

9. A method, comprising:
receiving a packet transmitted to a Bluetooth™ mesh network via a radio-frequency signal;
determining a measure of strength of the radio-frequency signal;
determining a time period to wait to receive the packet again based on at least the measure of strength of the radio-frequency signal;
determining whether the packet was received again during the time period; and
transmitting the packet to relay the packet to the Bluetooth™ mesh network in response to determining that the packet was not received again during the time period.

10. The method of claim 9, further comprising:
refraining from transmitting the packet to the Bluetooth™ mesh network in response to determining that the packet was received again during the time period.

11. The method of claim 9, wherein the Bluetooth™ mesh network comprises a plurality of Bluetooth™ devices and wherein packets are communicated by relaying the packets via the plurality of Bluetooth™ devices.

12. The method of claim 11, wherein transmitting the packet comprises:
broadcasting the packet to the plurality of Bluetooth™ devices of the Bluetooth™ mesh network.

13. The method of claim 9, wherein determining the measure of strength of the radio-frequency signal comprises:
determining a received signal strength indication (RSSI) for the radio-frequency signal.

14. The method of claim 9, wherein a duration of the time period is correlated with the measure of strength of the radio-frequency signal.

15. The method of claim 9, wherein determining the time period comprises:
calculating the time period based on a function of the measure of strength of the radio-frequency signal.

16. The method of claim 9, wherein determining the time period comprises:
selecting the time period from a plurality of time periods, wherein the plurality of time periods is associated with a plurality of ranges of strengths.

17. A system comprising:
a first node configured to transmit a packet to a Bluetooth™ mesh network via a radio-frequency signal; and
a second node configured to:
receive the packet;
determine a strength of the radio-frequency signal;
determine a time period to wait to receive the packet again based on the measure of strength of the radio-frequency signal;
determine whether the packet was received again during the time period; and
transmit the packet to relay the packet to the Bluetooth™ mesh network in response to determining that the packet was not received again during the time period.

18. The system of claim 17, wherein the second node is further configured to:
refrain from transmitting the packet to the Bluetooth™ mesh network in response to determining that the packet was received again during the time period.

19. The system of claim 17, wherein to determine the time period, the second is configured to:
calculate the time period based on a function of the measure of strength of the radio-frequency signal.

20. The system of claim 17, wherein to determine the time period, the second node is configured to:
select the time period from a plurality of time periods, wherein the plurality of time periods is associated with a plurality of ranges of strengths.

* * * * *